March 25, 1947.    M. WATTER    2,418,060
AIRCRAFT CONTROL MECHANISM
Filed Aug. 30, 1943    6 Sheets-Sheet 1
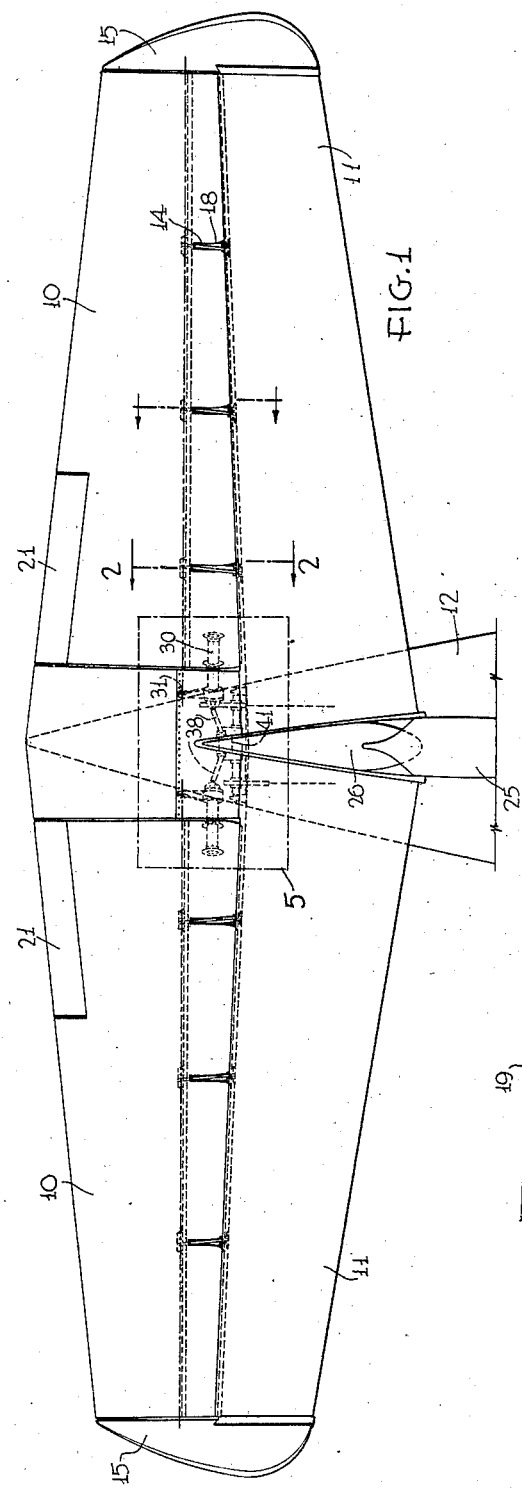
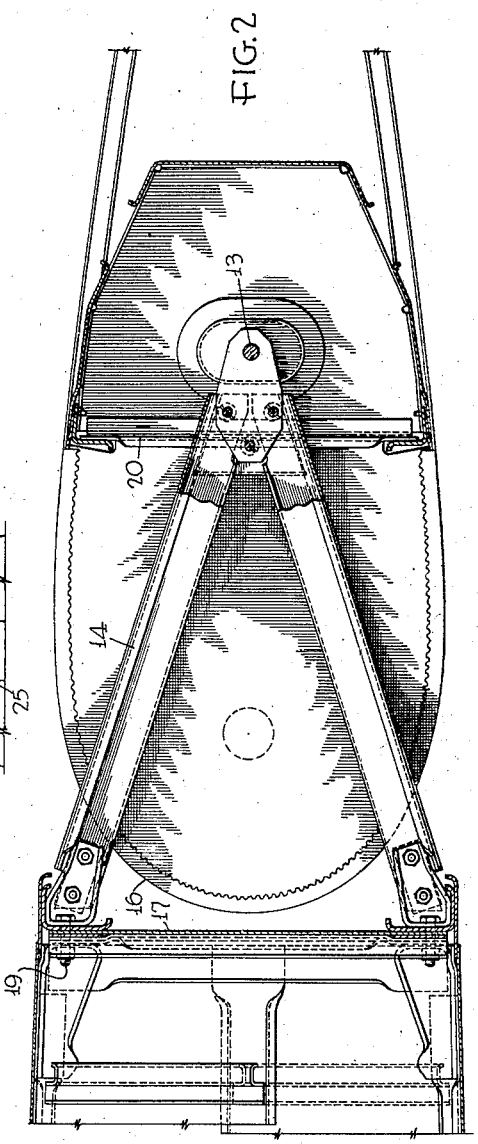
INVENTOR
Michael Watter.
BY John P. Tarbox
ATTORNEY

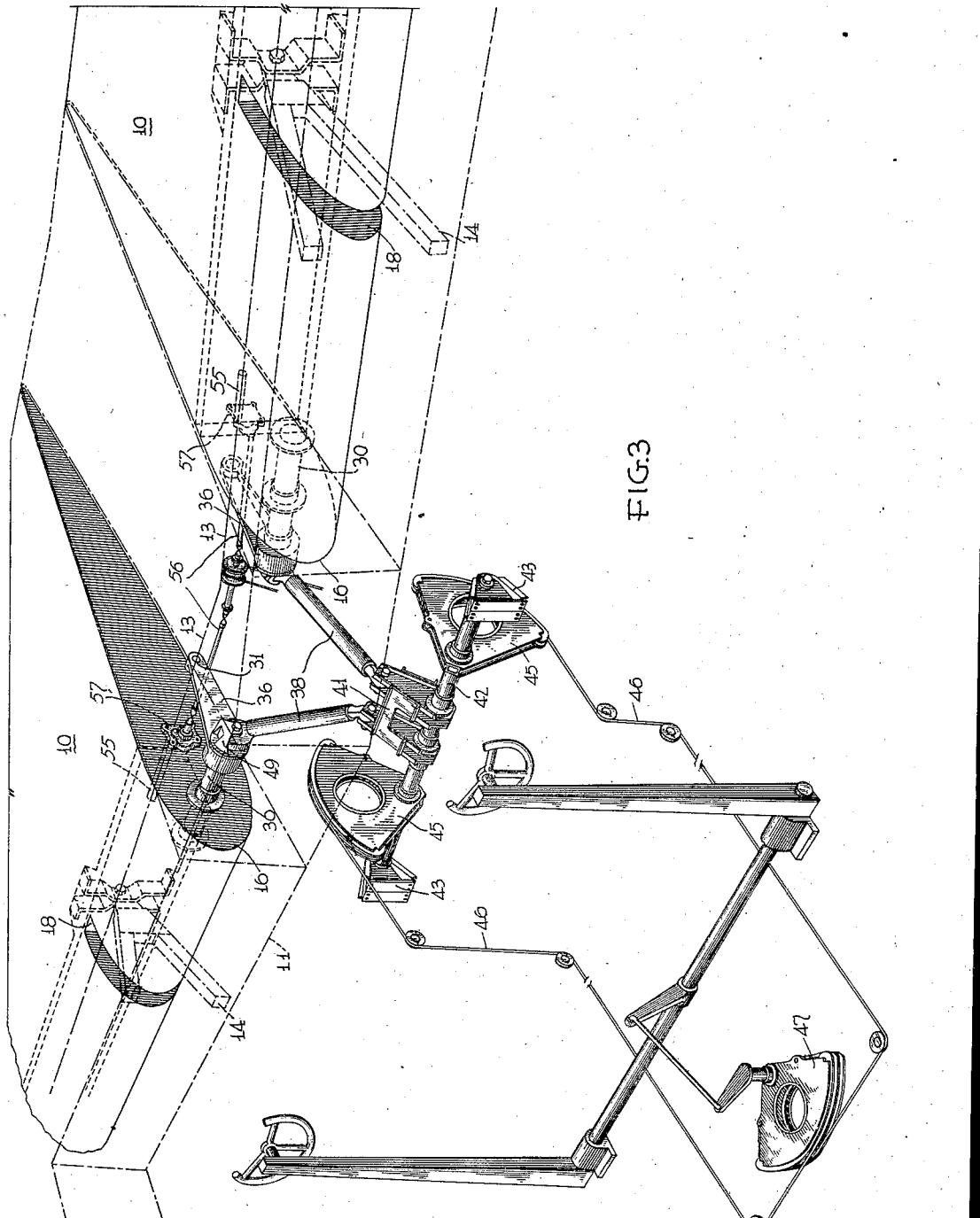

March 25, 1947. M. WATTER 2,418,060
AIRCRAFT CONTROL MECHANISM
Filed Aug. 30, 1943 6 Sheets-Sheet 3

INVENTOR
Michael Watter
BY John P. Tarbox
ATTORNEY

March 25, 1947.  M. WATTER  2,418,060
AIRCRAFT CONTROL MECHANISM
Filed Aug. 30, 1943  6 Sheets-Sheet 6

INVENTOR
Michael Watter
BY John P. Tarbox
ATTORNEY

Patented Mar. 25, 1947

2,418,060

UNITED STATES PATENT OFFICE 2,418,060

AIRCRAFT CONTROL MECHANISM

Michael Watter, Philadelphia, Pa., assignor to The Budd Company, Philadelphia, Pa., a corporation of Pennsylvania Application August 30, 1943, Serial No. 500,466

8 Claims. (Cl. 244—87)

This invention relates to aircraft control mechanism, particularly to control mechanism for the elevators of an airplane, and has for an object the provision of improvements in this art.

One of the more specific objects of the invention is the provision of an extremely rigid connection between two airfoils, such as elevators, which are disposed on opposite sides of a fuselage and act coordinately, particularly in a construction in which the elevators form a pronounced dihedral at the fuselage.

Another object is to provide a construction which permits easy removal and replacement of the airfoils.

Another object is to provide a construction which presents no obstruction at the hinge axis at the inner end of a dirigible airfoil, whereby auxiliary equipment such as trim tab controls, may be installed.

Another object is to provide a sturdy mounting inside the fuselage for the inner virtual or false bearing of the dirigible airfoil.

Another object is to utilize the strong hollow nose spar construction of an airfoil for the mounting of the airfoil operating element, thereby securing greater rigidity and better dynamic balance and dispensing with the requirement for additional parts such as heavy shafts and operating arms therefor.

Another object is to eliminate shafts and shaft torque between spaced coordinately operating dirigible airfoils.

Another object is to provide effective and simple universal connection joints at the ends of push-pull strut links.

The above and other objects of the invention will be apparent from the following description of an exemplary embodiment thereof, reference being made to the accompanying drawings wherein:

Fig. 1 is a top plan view of the horizontal stabilizers and elevators of an airplane embodying the present invention;

Fig. 2 is an enlarged vertical chordwise section taken on the line 2—2 of Fig. 1, showing an elevator hinge connection;

Fig. 3 is a front phantom perspective view of the elevator operating mechanism;

Figure 4:
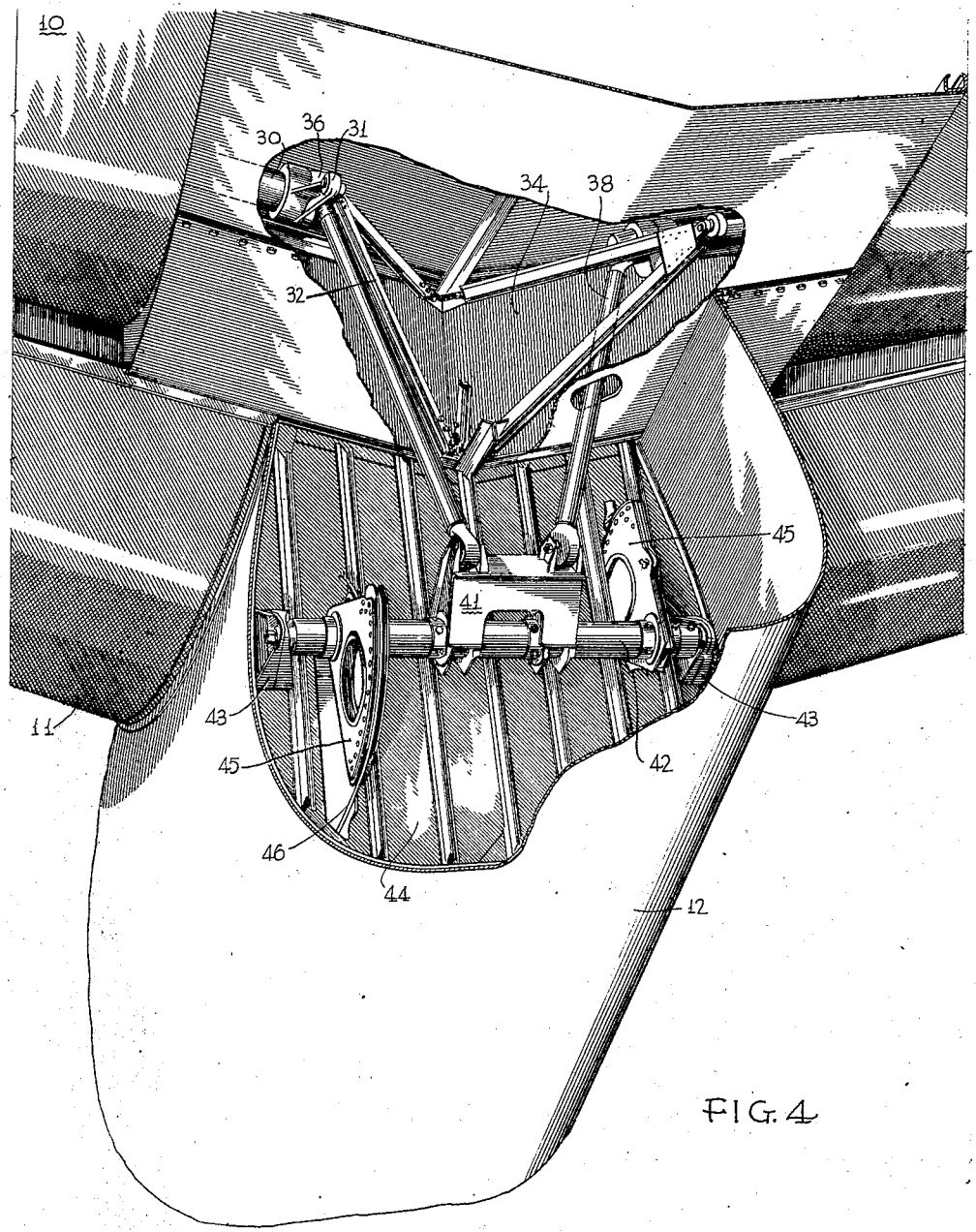
Fig. 4 is a rear nether perspective view of the operating mechanism and related parts.
Figure 5:
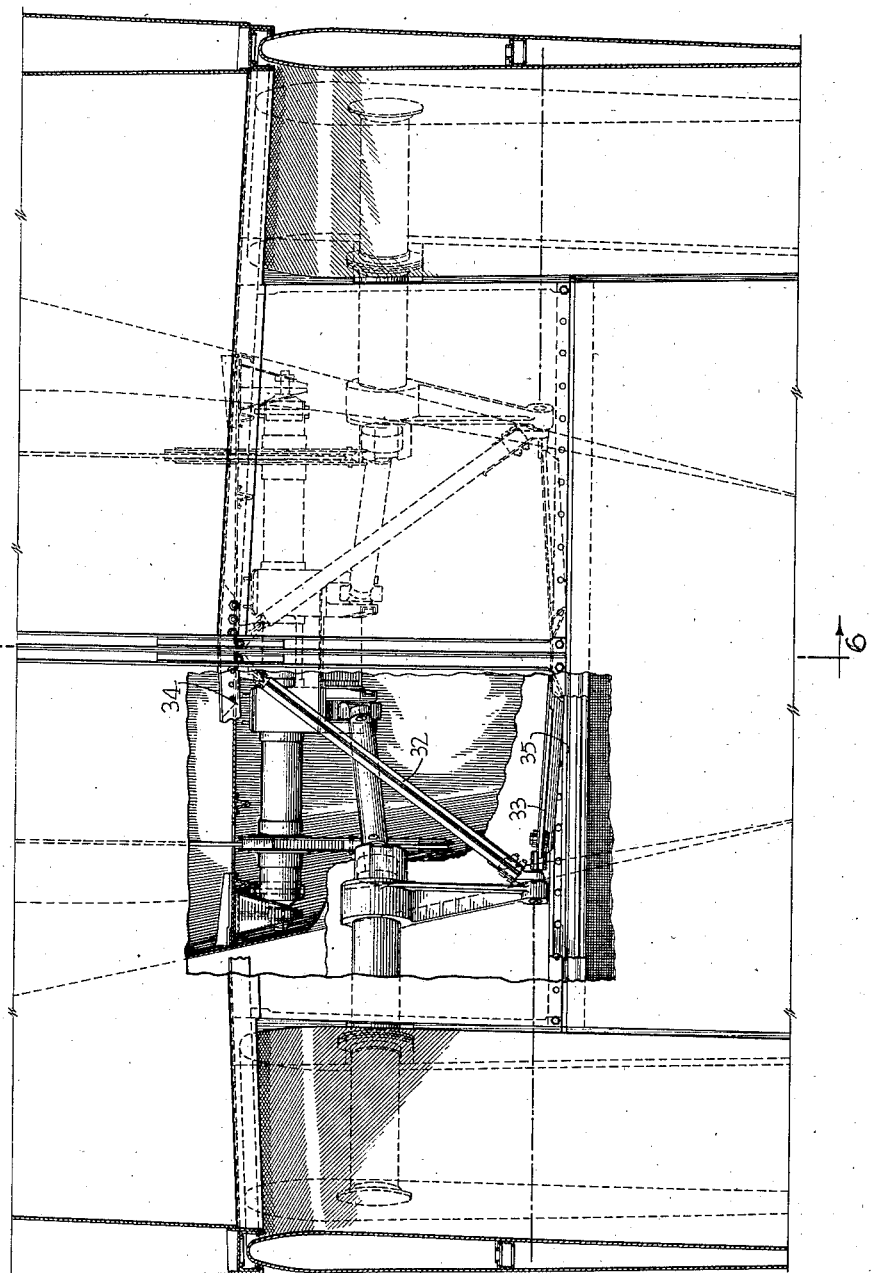
Fig. 5 is a partial enlarged top plan view in the enclosed area 5 of Fig. 1, parts being broken away to reveal the operating mechanism.

In the specific illustrated embodiment of the invention the control surfaces or airfoils which are to be controlled are the elevators 10 which are movably mounted on a horizontal stabilizer 11 carried on a fuselage 12. The stabilizer has a central portion which is secured to the top of the fuselage or may be built integrally therewith. The entire supporting structure may be referred to as the central body. The elevators are hinged each at its hinge axis 13 on a plurality of hinge brackets 14 and a stabilizer tip 15. The hinge line or axis 13 for each elevator is located behind the leading edge or nose 16 of the elevator and the nose moves up and down behind the rear spar and enclosure 17 of the stabilizer. The hinge brackets are disposed in slots 18 formed in the nose of the elevator and at their leading ends are detachably secured as by bolts 19 to the stabilizer spar 17. The metal covered nose portion of the elevator together with its rear boundary wall 20 forms, in effect, a hollow spar extending from approximately the hinge line 13 to the extreme leading edge 16 of the elevator. The nose is shown to be covered over the metal with fabric.

The rear edges of the elevators at the inner ends are provided with trim tabs 21. The vertical fin is shown in Fig. 1 and is referred to by the numeral 25 for purposes of identification. The rudder is referred to by the numeral 26.

Figure 6:
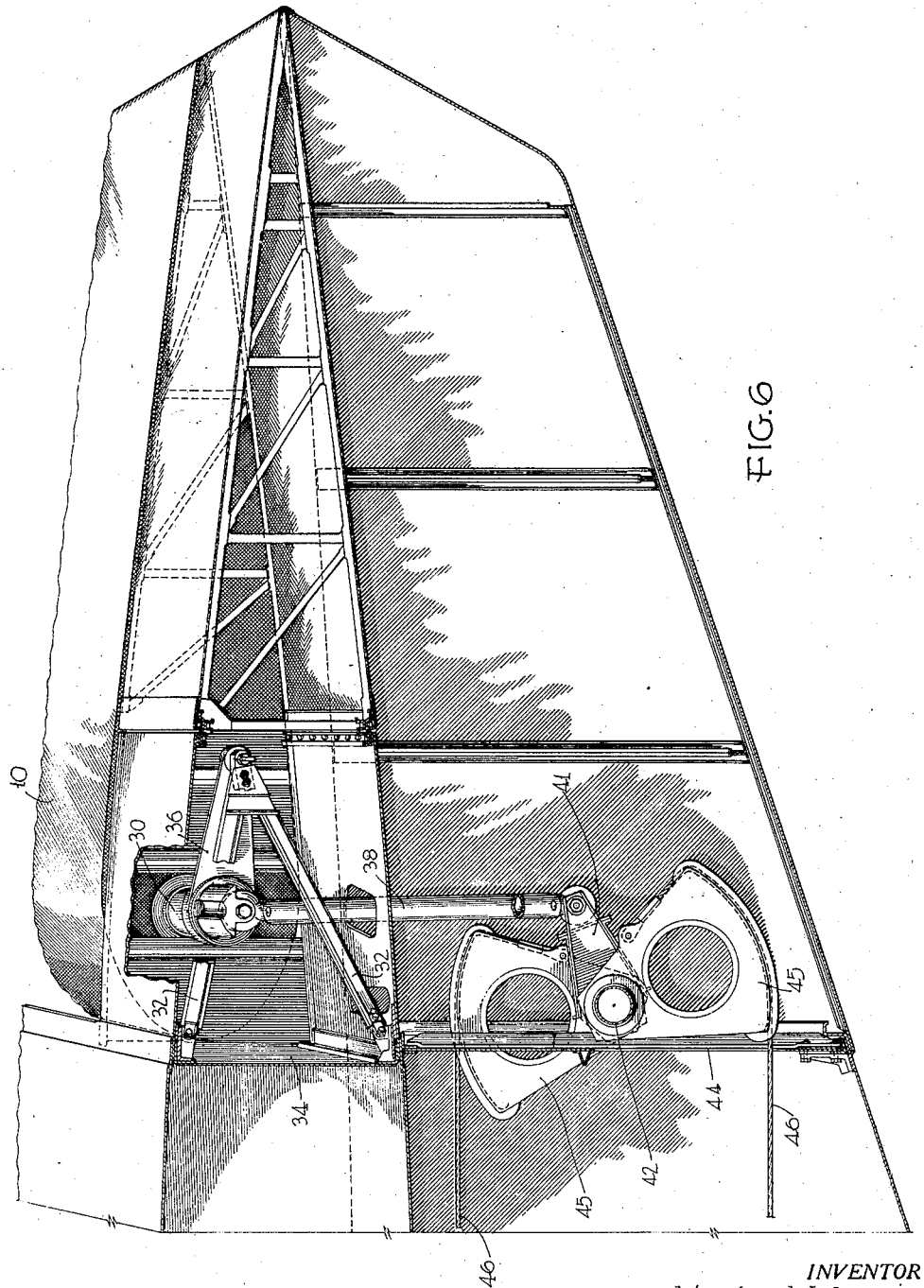
Fig. 6 is a medial vertical section taken approximately on the line 6—6 of Fig. 5.

The elevator operating mechanism, now to be described and to which the invention is particularly directed comprises a rigid but light tubular projection 30 which is secured to the end rib and other frame structure of the elevator at a distance from the hinge line. The projection passes through an opening, such as a slot in the side of the body (Fig. 6).

In order to constrain the projection to true arcuate movement about the hinge axis of the elevator an interior bearing 31 is provided within the body. It may be referred to as a virtual or false bearing. This bearing is mounted at the connected apices of two V-frames 32 and 33. The front V-frame 32 is secured to a front bulkhead or frame 34 and the rear V-frame 33 is secured to a rear bulkhead or frame 35. The spread ends of the V-frames from both sides for the two elevators are inclined toward the center of the fuselage. The front bulkhead 34 is, in effect, formed as a continuation of the rear spars of the horizontal stabilizers which extend into and are connected together within the body.

Figure 7:
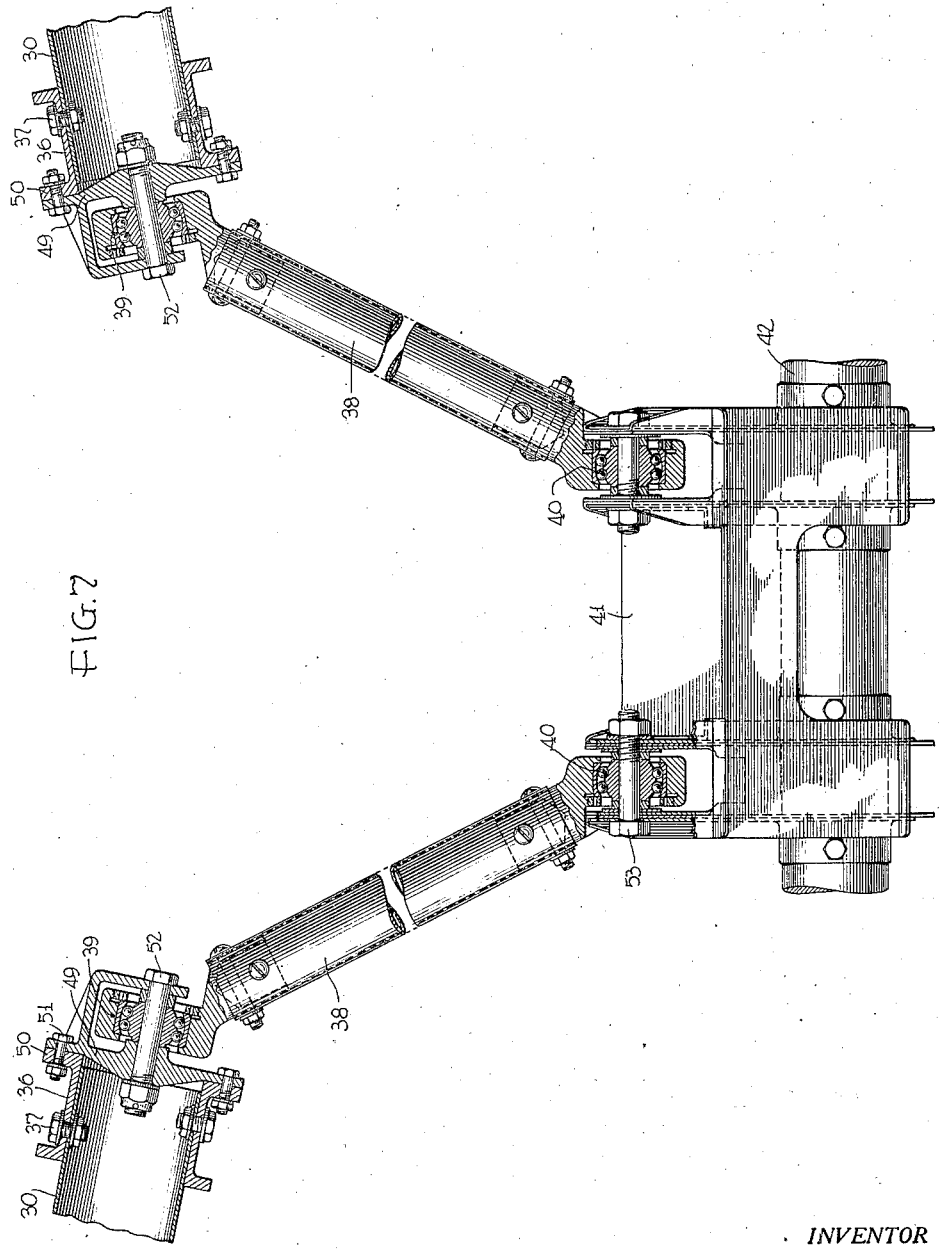
Fig. 7 is an enlarged generally vertical elevation and section of the push-pull strut links and closely related parts.

An arm 36 is secured to the end of an elevator projection 30 and at its other end turns about the false bearing 31. Preferably, as shown in Fig. 7, the connection of the arm 36 to the projection 30 is made through bolts 37 which can be removed. This frees the elevator projections quickly from their interior fittings and permits the elevators to be easily removed from the stabilizer.

The elevators are operated through rigid push-pull strut links 38 which are connected at their upper ends by universal spherical bearings 39 to the projections and by similar bearings 40 at their lower ends to a box arm 41 secured to a cable shaft 42. The cable shaft 42 is mounted at its ends in bearing brackets 43 secured to the body bulkhead 44, which is effectively a continuation of the bulkhead 34 previously referred to. To the cable shaft 42 there are secured sectors or quadrants 45 to which are attached operating cables 46 leading to the pilot's control sector or quadrant 47 (Fig. 3).

The mounting 49 which supports the upper bearing 39 is removably attached to a flange 50 of the arm 36 by bolts 51 and the inner part of the bearing is removably attached to the mounting by a center bolt or bearing pin 52. The inner portion of the lower bearing 40 is removably secured to the box arm 41 by a center bolt or bearing pin 53. The bolts 52 and 53 are parallel to the respective axes of the parts connected to the push-pull rod, here the projection 30 and the shaft 42, which avoids binding during operation. It is to be noted that the dual connection box arm 41 is located approximately on the vertical central plane of the body. The ends of the bearing V-frames 32 and 33 also are located adjacent this central plane. This arrangement avoids the ill effects of body weave and also takes advantage of the stiffening effect of the fin and related structure which provides great strength along this central plane.

By securing the lower ends of the push-pull links to a common rigid box arm, all torque and twist which would be entailed by spaced structures on a shaft are avoided. The links must move in unison.

By securing the upper ends of the push-pull links to short rigid projections which are secured directly to the ends of the elevators, the torque and twist which would be entailed by shaft connections here are avoided.

From this it follows that the connection from one elevator to the other through the projections, links, and box arm, is a very rigid one which provides practically no possibility for unequal motion of the elevators. Most of the distance between elevators is occupied by the push-pull links which have negligible change in length with tension and compression within the limits of the loads to be taken.

The arrangement is useful for elevators which are located in the same plane but is particularly useful for elevators which form a dihedral at the fuselage, since the use of shafts and shaft couplings in the line of connection between elevators is avoided.

The construction also leaves the inner end of the elevator at the hinge line entirely clear whereby mechanism, such as the trim tab operating shaft 55, may be passed into the elevator along the hinge line axis, as shown. The shaft 55 is driven from the offset shaft 56 through a gear box 57.

The operation and advantages of the apparatus, insofar as not already specifically described, will be clear from the description and illustration. It will be seen that the apparatus provides a very strong connection between elevators which is practically independent of shaft torque; that substantially only the factors of tension and compression are involved and that these are very small because of the great rigidity of the connecting members; that the elevators are connected at their front ends to the elevator operators; and that the inner ends of the elevators are left clear for the installation of other equipment. While the invention has been shown as applied to airfoils which move together in the same direction, it may, at least in part, be applied to airfoils which move in opposite directions or even to a single airfoil which moves alone. It is, therefore, to be understood that the invention may be variously embodied within the limits of the prior art and the scope of the subjoined claims.

What is claimed is:

1. In an aircraft, in combination, a body, a stabilizer mounted on said body, an airfoil removably hinged on said stabilizer, a projection on the inner front end of the airfoil forward of the hinge line passing through a slot in the side of the body, a hinge arm mounted on a support inside the body on the airfoil hinge line extended, said hinge arm having a sleeved end removably secured to the inner end of said projection, said sleeve having a flange on its inner end, a bearing bracket having a plate removably secured to said flange, and a push-pull operating link having a universal bearing connection to said bracket, said bearing being removably connected to said bracket.

2. Apparatus as set forth in claim 1, further characterized by the fact that the hinge mounting for said hinge arm comprises two V-brackets secured to spaced transverse bulkheads in said body.

3. Apparatus as set forth in claim 1, further characterized by the fact that the hinge mounting for said hinge arm comprises two V-brackets connected at their apices at the hinge line and at their spaced ends secured to spaced transverse bulkheads in said body, the spaced ends of the V-brackets and the distal end of said push-pull link all being located approximately at the central vertical plane of the body.

4. In an aircraft, in combination, a fuselage, dihedral stabilizers mounted on said fuselage, an elevator removably hinged on a stabilizer at each side of the fuselage, a vertical fin mounted above said fuselage at the central vertical plane and rigidifying the fuselage thereat, a projection on each elevator at the inner front end forward of the hinge line, said projections operating in slots in the sides of the fuselage, a hinge arm secured to the inner end of each projection and turnably supported by the fuselage on the elevator hinge line at a distance inside the fuselage, brackets supporting the arm bearing from the central vertical plane of the fuselage, a transverse bulkhead in said fuselage, a transverse cable shaft supported on said bulkhead, a box arm secured on said shaft at the central vertical plane of the fuselage, and push-pull strut links operably connected between said projections and said box arm.

5. In an aircraft, in combination, a body, a stabilizer mounted on said body, an airfoil hinged on said stabilizer, a projection on the inner front end of the airfoil forward of the hinge line, a hinge arm mounted on the body on the airfoil hinge line inside the body, a push-pull operating link, and detachable means including a bearing forming a connection between said projection, arm and link.

6. In an aircraft, in combination, a body, spaced supports in a plane containing the longitudinal axis of said body, an airfoil hinge mounting comprising two V-brackets connected at their apices at the hinge line and at their spaced ends secured to the spaced supports approximately in said longitudinal axial plane.

7. In an aircraft, in combination, a body, an airfoil hinged on each side transversely of the longitudinal body axis, a push-pull rod connected to the front end of each airfoil forward of the hinge line on each side of the body, and airfoil hinge mountings each comprising two V-brackets connected together at their apices at the hinge line, the V-brackets at their other ends and the other ends of the push-pull rods being connected to supporting means on the body approximately in a common longitudinal axial plane.

8. In an aircraft, in combination, a body, dihedral stabilizers mounted on said body, elevators hinged to said stabilizers and having dihedral hinge axes, projections mounted directly on the inner ends of said elevators at one side of the dihedral hinge lines, so as to furnish leverage about the hinge line, an operating arm disposed approximately on the center line of the body and at one side of said projections, a shaft for said operating arm mounted to turn about a fixed axis on said body, the shaft also being held against endwise movement along its axis, push-pull links connected by universal joints directly to said projections and said arm at their respective ends, and a hinge mounting for said projections inside said body.

MICHAEL WATTER.

REFERENCES CITED

The following references are of record in the file of this patent:

UNITED STATES PATENTS

| Number | Name | Date |
|---|---|---|
| 1,892,915 | Vinje | Jan. 3, 1933 |
| 1,778,892 | Fokker | Oct. 21, 1930 |
| 2,137,385 | Butler | Nov. 22, 1938 |
| 1,808,991 | Langdon | June 9, 1931 |
| 1,921,294 | Hicks | Aug. 8, 1933 |
| 1,874,459 | Cousineau | Aug. 30, 1932 |

FOREIGN PATENTS

| Number | Country | Date |
|---|---|---|
| 446,260 | German | June 27, 1927 |
| 394,452 | British | June 29, 1931 |
| 465,627 | British | May 11, 1937 |